United States Patent
Tanaka

(10) Patent No.: US 7,902,982 B2
(45) Date of Patent: Mar. 8, 2011

(54) RFID INTERROGATOR AND RFID-INTERROGATOR CONTROL METHOD

(75) Inventor: Yoshinori Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 984 days.

(21) Appl. No.: 11/790,790

(22) Filed: Apr. 27, 2007

(65) Prior Publication Data
US 2008/0068168 A1    Mar. 20, 2008

(30) Foreign Application Priority Data

Sep. 14, 2006   (JP) .................................. 2006-249832

(51) Int. Cl.
*G08B 13/14*   (2006.01)

(52) U.S. Cl. .............. 340/572.1; 340/10.31; 340/539.13; 340/10.1; 340/3.41

(58) Field of Classification Search ............. 340/10.1–7, 340/572.1, 3.41, 539.13
See application file for complete search history.

(56) References Cited

U.S. PATENT DOCUMENTS

| | | | | |
|---|---|---|---|---|
| 5,686,902 A * | 11/1997 | Reis et al. ...................... | 340/10.2 |
| 6,393,457 B1 * | 5/2002 | Allison et al. ................. | 709/201 |
| 6,643,278 B1 * | 11/2003 | Panasik et al. ................ | 370/330 |
| 6,975,206 B2 * | 12/2005 | Reining ........................ | 340/10.2 |
| 7,009,518 B2 * | 3/2006 | Liao et al. ................... | 340/572.1 |
| 7,253,717 B2 * | 8/2007 | Armstrong et al. ........... | 340/10.2 |
| 2002/0045956 A1 * | 4/2002 | Kapitan ........................ | 700/56 |
| 2002/0175805 A9 * | 11/2002 | Armstrong et al. ......... | 340/10.31 |
| 2005/0219039 A1 * | 10/2005 | Allen ........................... | 340/10.2 |
| 2006/0251098 A1 * | 11/2006 | Morioka ....................... | 370/432 |
| 2007/0075838 A1 * | 4/2007 | Powell ......................... | 340/10.2 |

OTHER PUBLICATIONS

"Electromagnetic Compatibility and Radio Spectrum Matters (ERM); Radio Frequency Identification Equipment Operating in the Band 865 MHz to 868 MHz with Power Levels Up to 2 W; Part 1: Technical Requirements and Methods of Measurement," *ETSI EN 302 208-1*, V1.1.1 (Sep. 2004).

* cited by examiner

*Primary Examiner* — Benjamin C Lee
*Assistant Examiner* — Quang Pham
(74) *Attorney, Agent, or Firm* — Fujitsu Patent Center

(57) ABSTRACT

A nonresponse-ratio determining unit determines, after starting a signal transmission to an electronic tag, whether a ratio of number of nonresponses from the electronic tag exceeded a predetermined value in a first predetermined period. A signal-transmission terminating unit terminates, when it is determined that the ratio of the number of nonresponses exceeded the predetermined value, the signal transmission for a second predetermined period. A radio-frequency-identification interrogator performs, after a lapse of the second predetermined period, a communication-channel selecting process for restarting the signal transmission to the electronic tag.

20 Claims, 8 Drawing Sheets

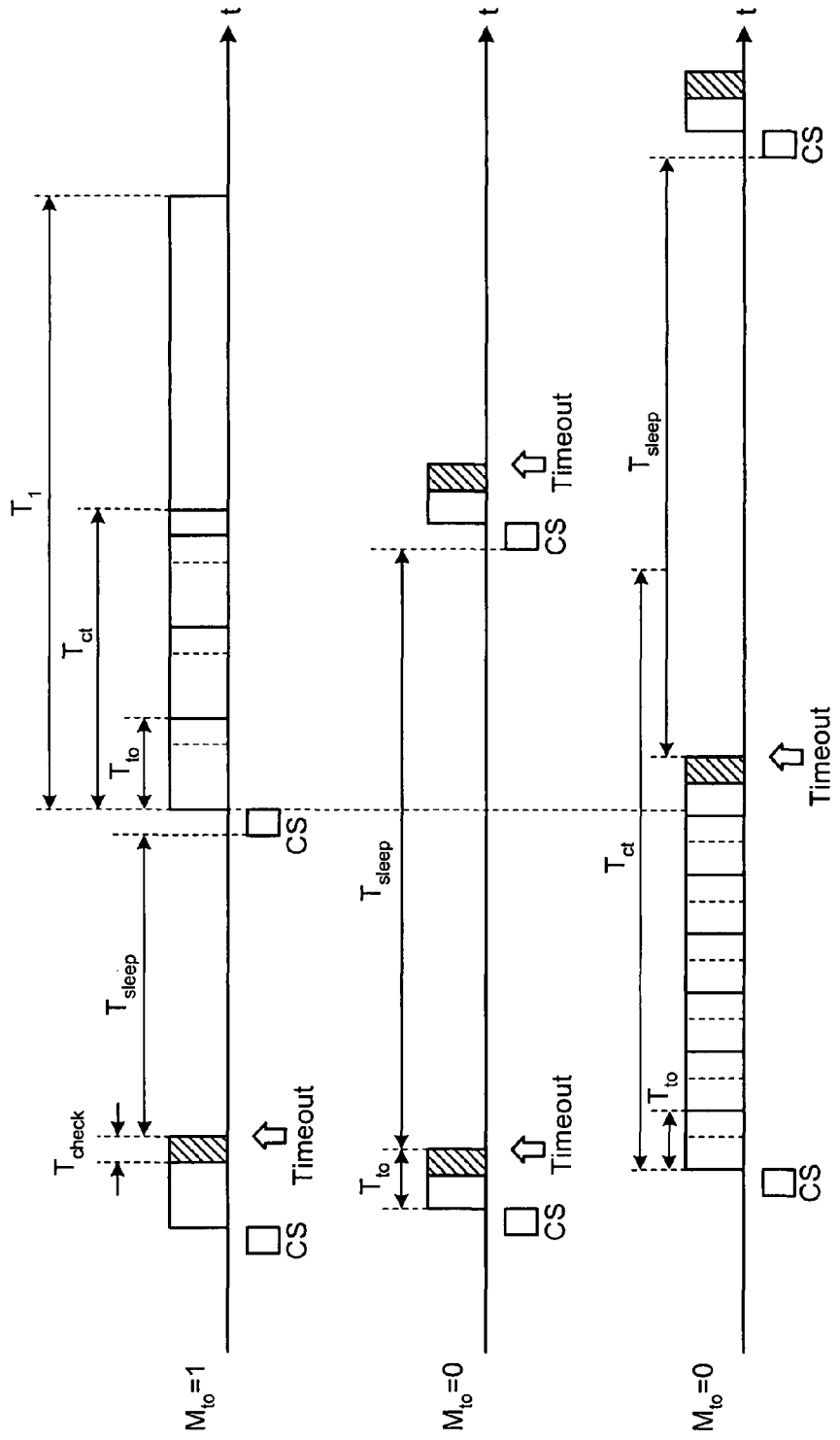

RFID INTERROGATOR AND RFID-INTERROGATOR CONTROL METHOD

BACKGROUND OF THE INVENTION

1. Field of the Invention

The present invention relates to a technology for performing a carrier sensing for selecting, upon stipulation of a maximum continuous transmission period for continuously transmitting signals to an electronic tag and a minimum transmission termination period for terminating the signal transmission after lapse of the maximum continuous transmission period, an appropriate frequency to be used in the signal transmission during the minimum transmission termination period before transmitting a signal to the electronic tag.

2. Description of the Related Art

Recently, a radio frequency identification (RFID) is one of the emphasized technologies in ubiquitous society. A system that uses the RFID includes interrogators such as reader/writers, readers etc., and responding devices such as electronic tags, wireless integrated-circuit (IC) tags, wireless tags, and RFID tags. For example, in a widely known RFID system, the reader/writers carry out product control by reading and writing data inside the electronic tags that are attached to products.

The RFID system includes a plurality of reader/writers that are interfaces to communicate with the electronic tags. A correspondence is established between the electronic tags and the reader/writers. Each reader/writer communicates with the corresponding electronic tag, thereby enabling to read and write data in the electronic tag.

If the reader/writers are communicating using radio waves of the same frequency, the reader/writers interfere with each other. For example, in a technology disclosed in European Telecommunications Standards Institute, "Electromagnetic compatibility and Radio spectrum Matters (ERM); Radio Frequency Identification Equipment operating in the band 865 MHz to 868 MHz with power levels up to 2W; Part 1: Technical requirements and methods of measurement", ETSI EN 302 208-1, V1.1.1, P. 9, 10, 26, each reader/writer carries out carrier sensing before starting communication and searches for an unused channel (frequency). Thus, by using the unused channels, the interference between the reader/writers can be avoided.

A system, which carries out the carrier sensing, regulates a maximum continuous transmission period that enables to continuously transmit signals and a minimum transmission termination period that terminates signal transmission after lapse of the maximum continuous transmission period. Because a reader/writer that is awaiting signal transmission can get a chance to acquire a channel during a transmission termination period of the reader/writer in the signal transmission, the channels can be evenly used.

However, in the conventional technology represented in the above literature, if the multiple reader/writers included proximally transmit signals simultaneously, the electronic tag receives the signals from the multiple reader/writers. Due to this, the electronic tag is not able to receive data correctly, thus resulting in interference between the reader/writers and the electronic tag. Because the electronic tag does not have frequency selectivity, even if each reader/writer carries out the carrier sensing and transmits the signals using different frequencies, the electronic tag responds to the signals from any of the reader/writers.

To overcome the aforementioned drawback, for example, carrying out intensive control of a time-sharing operation is effective in preventing a time overlap during transmission of the reader/writers. However, because an extent of the interference from each reader/writer must be grasped beforehand to decide a control method, complex settings need to be carried out each time a set up environment changes.

SUMMARY OF THE INVENTION

It is an object of the present invention to at least partially solve the problems in the conventional technology.

A radio-frequency-identification interrogator according to one aspect of the present invention performs a communication-channel selecting process for selecting, upon stipulation of a maximum continuous transmission period to continuously transmit a signal to an electronic tag and a minimum transmission termination period to terminate a signal transmission after a lapse of the maximum continuous transmission period, an appropriate communication channel to be used in the signal transmission before the signal transmission to the electronic tag in the minimum transmission termination period. The radio-frequency-identification interrogator includes a nonresponse-ratio determining unit that determines, after starting the signal transmission, whether a ratio of number of nonresponses from the electronic tag exceeded a predetermined value in a first predetermined period; and a signal-transmission terminating unit that terminates, when it is determined that the ratio of the number of nonresponses from the electronic tag exceeded the predetermined value in the first predetermined period, the signal transmission to the electronic tag for a second predetermined period. The radio-frequency-identification interrogator performs, after a lapse of the second predetermined period, the communication-channel selecting process for restarting the signal transmission to the electronic tag.

A method according to another aspect of the present invention is for controlling a radio-frequency-identification interrogator that performs a communication-channel selecting process for selecting, upon stipulation of a maximum continuous transmission period to continuously transmit a signal to an electronic tag and a minimum transmission termination period to terminate a signal transmission after a lapse of the maximum continuous transmission period, an appropriate communication channel to be used in the signal transmission before the signal transmission to the electronic tag in the minimum transmission termination period. The method includes determining, after starting the signal transmission, whether a ratio of number of nonresponses from the electronic tag exceeded a predetermined value in a first predetermined period; terminating, when it is determined that the ratio of the number of nonresponses from the electronic tag exceeded the predetermined value in the first predetermined period, the signal transmission to the electronic tag for a second predetermined period; and performing, after a lapse of the second predetermined period, the communication-channel selecting process for restarting the signal transmission to the electronic tag.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic for explaining an example of an operation (when three reader/writers are included) according to the embodiment.

DETAILED DESCRIPTION OF THE PREFERRED EMBODIMENTS

Exemplary embodiments of the present invention are explained in detail below with reference to the accompanying drawings. According to the embodiments, an RFID interrogator is used as an IC tag reader/writer (hereinafter, "a reader/writer") and electronic tags that are used as RFID responding devices are embedded in a passive type IC having a maximum communication distance of approximately several meters.

Figure 1:
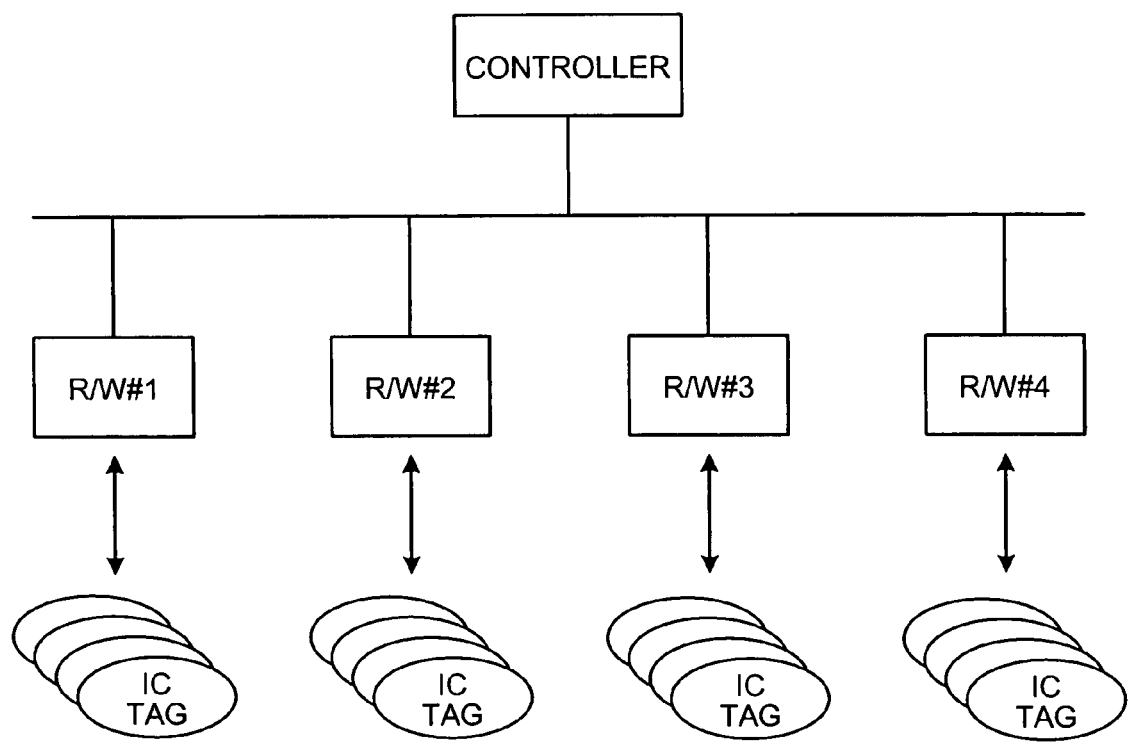
FIG. 1 is a schematic for explaining a control of multiple reader/writers.

FIGS. 1 to 5 are schematics for explaining a general reader/writer based on an RFID technology that is the prerequisite of the embodiments. FIG. 1 is a schematic for explaining a control of multiple reader/writers. Each of reader/writers R/W1 to R/W4 corresponds to multiple IC tags. The reader/writers R/W1 to R/W4 communicate with the corresponding multiple IC tags. A single controller intensively controls the reader/writers R/W1 to R/W4. Thus, the multiple reader/writers can communicate with stipulated target IC.

Figure 2:
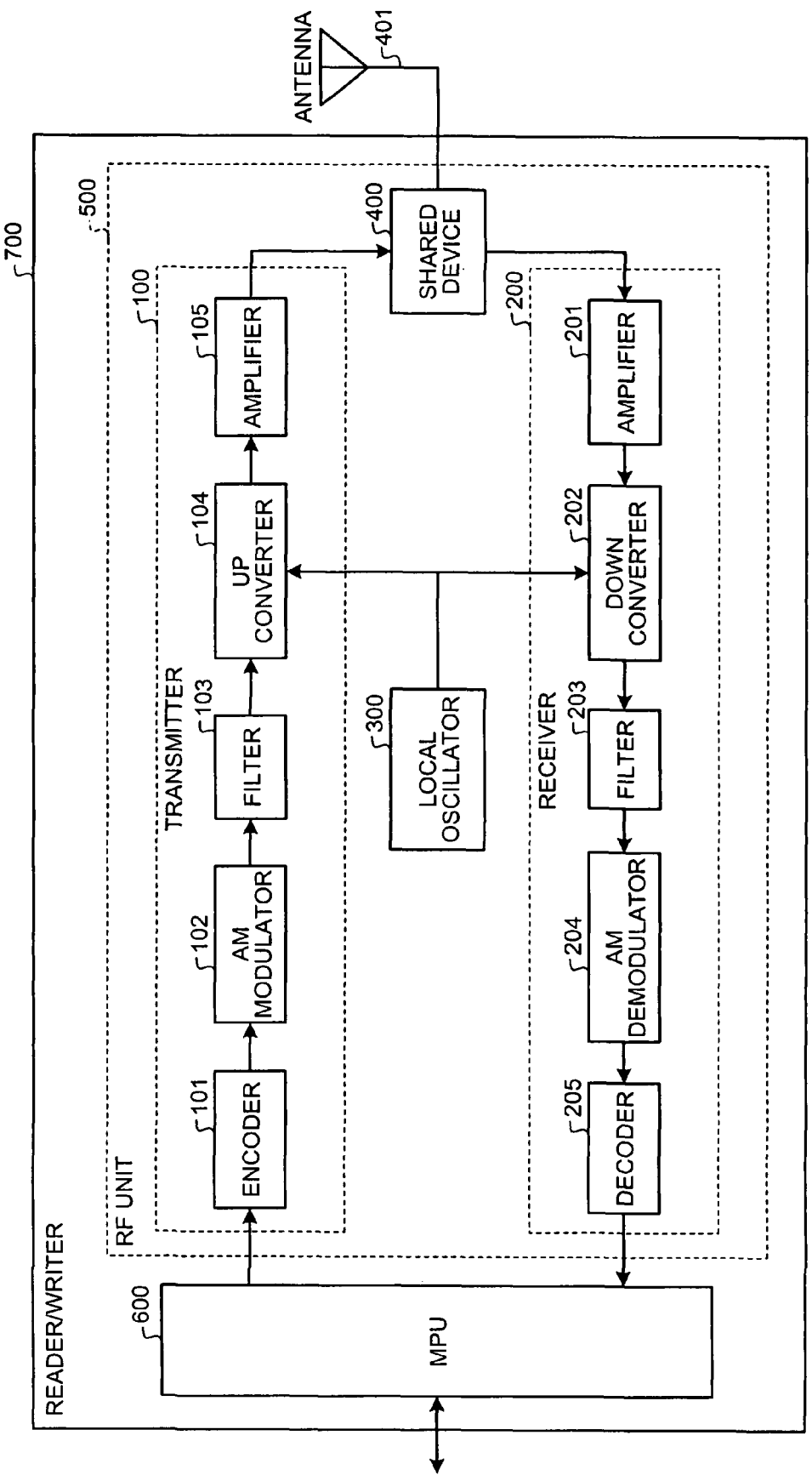
FIG. 2 is a functional block diagram of a structure of a reader/writer.

FIG. 2 is a functional block diagram of the structure of a reader/writer 700. The reader/writer 700 is connected to a host computer and mediates a transaction of data between the host computer and the IC tag. As shown in FIG. 2, the reader/writer 700 includes an RF unit 500 and a micro processing unit (MPU) 600 that generates a command that is transmitted to the IC tag, and analyzes a response that is received from the IC tag. The RF unit 500 includes a transmitter 100, a receiver 200, a local oscillator 300, and a coupling device 400 that uses an antenna 401 for transmitting and receiving the signals. The antenna 401 is connected to the RF unit 500.

The transmitter 100 includes an encoder 101, an amplitude-modulation (AM) modulator 102, a filter 103, an up converter 104, and an amplifier 105. The encoder 101 encodes a command (including a read command and a write command) that is input from the MPU 600 by Manchester encoding. For transmitting bit data by analog signals, the AM modulator 102 determines strong and weak portions of amplitude of a carrier wave. By allotting "0" or "1" respectively to such differences of the amplitude, the AM modulator 102 carries out amplitude modulation of the command that is encoded by the encoder 101 such that the bit data can be transferred.

The filter 103 selects a frequency of the carrier wave that is amplitude modulated by the AM modulator 102. By synthesizing an oscillation output of a fixed or a variable frequency that is output by the local oscillator 300 for frequency conversion, the up converter 104 converts the frequency of the carrier wave that is selected by the filter 103 to a desired high frequency. The amplifier 105 amplifies a gain of the carrier wave that is converted to the high frequency by the up converter 104. The carrier wave that includes the amplified gain is transmitted from the antenna 401 via the shared device 400.

The receiver 200 includes an amplifier 201, a down converter 202, a filter 203, an AM demodulator 204, and a decoder 205. The amplifier 201 amplifies a gain of a received carrier wave that is received from the antenna 401 via the shared device 400. Due to this, a weak received carrier wave is amplified. By synthesizing the frequency of the carrier wave that is band limited by the amplifier 201 with the oscillation output of the fixed or the variable frequency that is output by the local oscillator 300, the down converter 202 converts the frequency of the carrier wave to a desired low frequency.

The filter 203 selects the frequency of the carrier wave that is converted to the low frequency by the down converter 202. The AM demodulator 204 carries out amplitude demodulation and demodulates the analog signals from the bit data of the received wave. The decoder 205 decodes the data that is encoded by e.g. a FM0 encoding from baseband signals that are AM demodulated by the AM demodulator 204. An analog wave that is decoded by the decoder 205 is input into the MPU 600.

Figure 3:
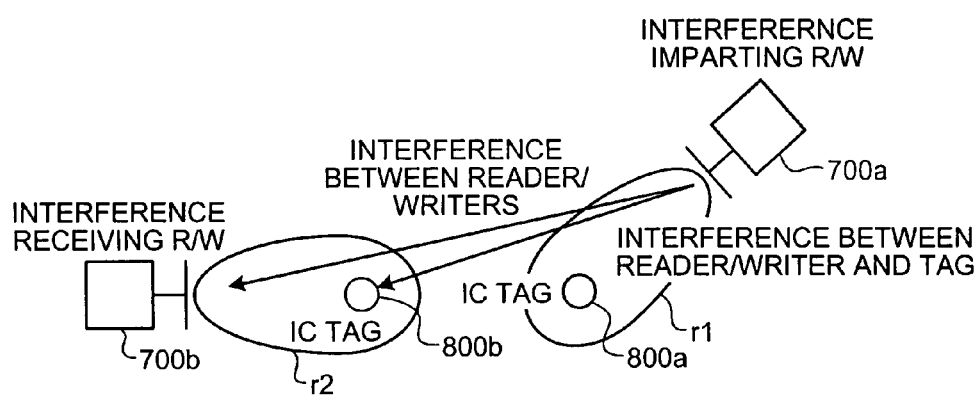
FIG. 3 is a schematic for explaining interference upon inclusion of the multiple reader/writers.

FIG. 3 is a schematic for explaining the interference upon inclusion of the multiple reader/writers. As shown in FIG. 3, an area r1 indicates a communication range of the reader/writer R/W 700a which will interfere the other reader/writers R/W 700b and the IC tag 800b. The area r1 includes an IC tag 800a. Further, an area r2 indicates a communication range of the reader/writer R/W 700b which will interfere the other reader/writers R/W 700a and the IC tag 800a. The area r2 includes an IC tag 800b.

Dense deployment of the multiple reader/writers results in the occurrence of "interference between the reader/writers" and "interference between the reader/writer and the tag". Because the interfering reader/writer R/W 700a and the victim reader/writer R/W 700b communicate with the IC tag using the same frequency, communication signals cannot be identified, thus resulting in the "interference between the reader/writers". However, in the conventional technology, using a different channel (frequency) for each reader/writer to communicate with the IC tag enables to overcome the interference between the reader/writers, as is explained later.

The IC tag which is located in an area other than the area r1 that has the interference from the reader/writer R/W 700a. Due to this, the IC tag is not able to respond to a command from a reader/writer that is originally expected to communicate with the IC tag, thus resulting in the "interference between the reader/writer and the tag". It is an objective of the present invention to eliminate the "interference between the reader/writer and the tag".

Figure 4:
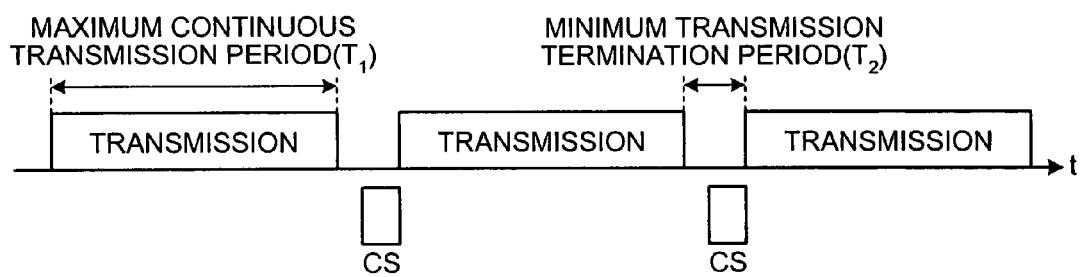
FIG. 4 is a schematic for explaining a transmission duty and a carrier sensing.

The conventional technology includes a limit on a maximum value of a command transmission period from the reader/writer (a maximum continuous transmission period $T_1$: $T_1$=4 seconds). Further, for carrying out a carrier sensing after lapse of the maximum value of the command transmission period, a minimum transmission termination period $T_2$ ($T_2$=50 milliseconds or 100 milliseconds) is included that terminates the command transmission. Due to this, the other reader/writers can carry out a carrier sensing by interrupting and start transmission using another channel. FIG. 4 is a schematic for explaining a transmission duty and the carrier sensing. The transmission duty indicates the command transmission period from the reader/writer. The transmission duty is a process that selects the channel for the command transmission.

As shown in FIG. 4, after the command transmission during the maximum continuous transmission period $T_1$ is finished, the command transmission is terminated only during the minimum transmission termination period $T_2$. The carrier sensing (CS) is carried out during the minimum transmission termination period $T_2$. The reader/writer acquires the channel by the carrier sensing and again carries out the command transmission during the maximum continuous transmission period $T_1$. After the command transmission during the maximum continuous transmission period $T_1$ is finished, the command transmission is terminated only during the minimum transmission termination period $T_2$, and the CS is carried out. The reader/writer captures the channel using the carrier sensing and again carries out the command transmission during the maximum continuous transmission period $T_1$.

Figure 5:
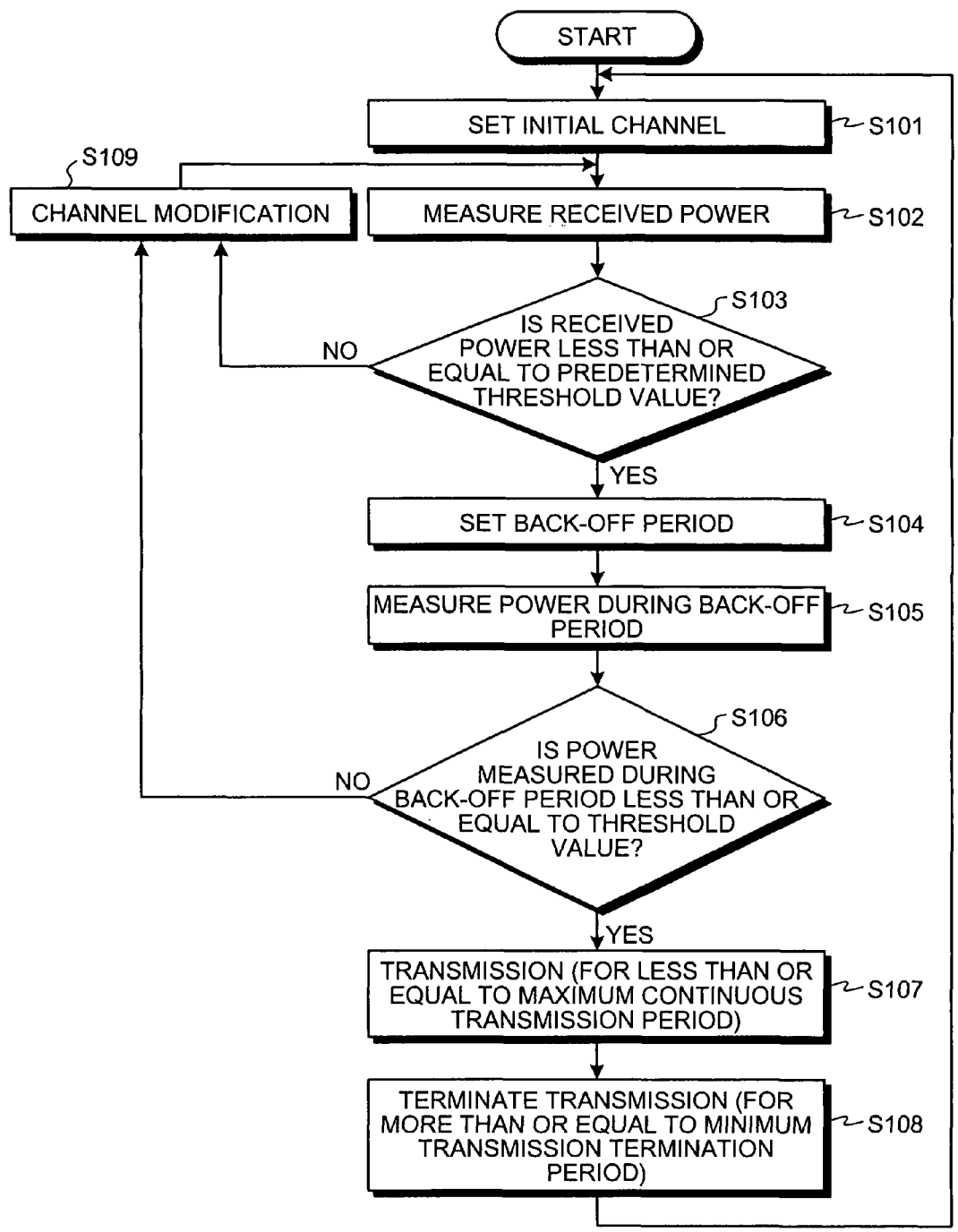
FIG. 5 is a flowchart of a sequence of a carrier sensing process.

FIG. 5 is a flowchart of the carrier sensing process. As shown in FIG. 5, first the MPU 600 of the reader/writer 700 sets an initial channel (frequency) (step S101). Next, the MPU 600 measures received power of the received wave of the channel (step S102) and determines whether the received power of the received wave is less than or equal to a predetermined threshold value (for example, −74 dBm) (step S103).

Upon the MPU 600 determining that the received power is less than or equal to the threshold value (step S103), the carrier sensing process moves to step S104. Upon the MPU 600 determining that the received power is larger than the threshold value (No at step S103), the carrier sensing process moves to step S109. Next, the MPU 600 randomly sets a back-off period that is a waiting period (step S104). The MPU 600 measures the received power during the back-off period that is set at step S104 (step S105).

The MPU 600 determines whether the power measured during the back-off period is less than or equal to the threshold value (for example, −74 dBm) (step S106). Upon the MPU 600 determining that the received power is less than or equal to the threshold value (Yes at step S106), the carrier sensing process moves to step S107. Upon the MPU 600 determining that the received power is larger than the threshold value (No at step S106), the carrier sensing process moves to step S109.

At step S107, the MPU 600 transmits a command during a time period that is less than or equal to the maximum continuous transmission period $T_1$. The MPU 600 terminates the command transmission during a time period that is more than or equal to the minimum transmission termination period $T_2$ (step S108). After a process of terminating the command transmission is finished, the carrier sensing process moves to step S101. The MPU 600 changes the channel (frequency) for the next carrier sensing at step S109. After a process of changing the channel is finished, the carrier sensing process moves to step S102.

Figure 6:
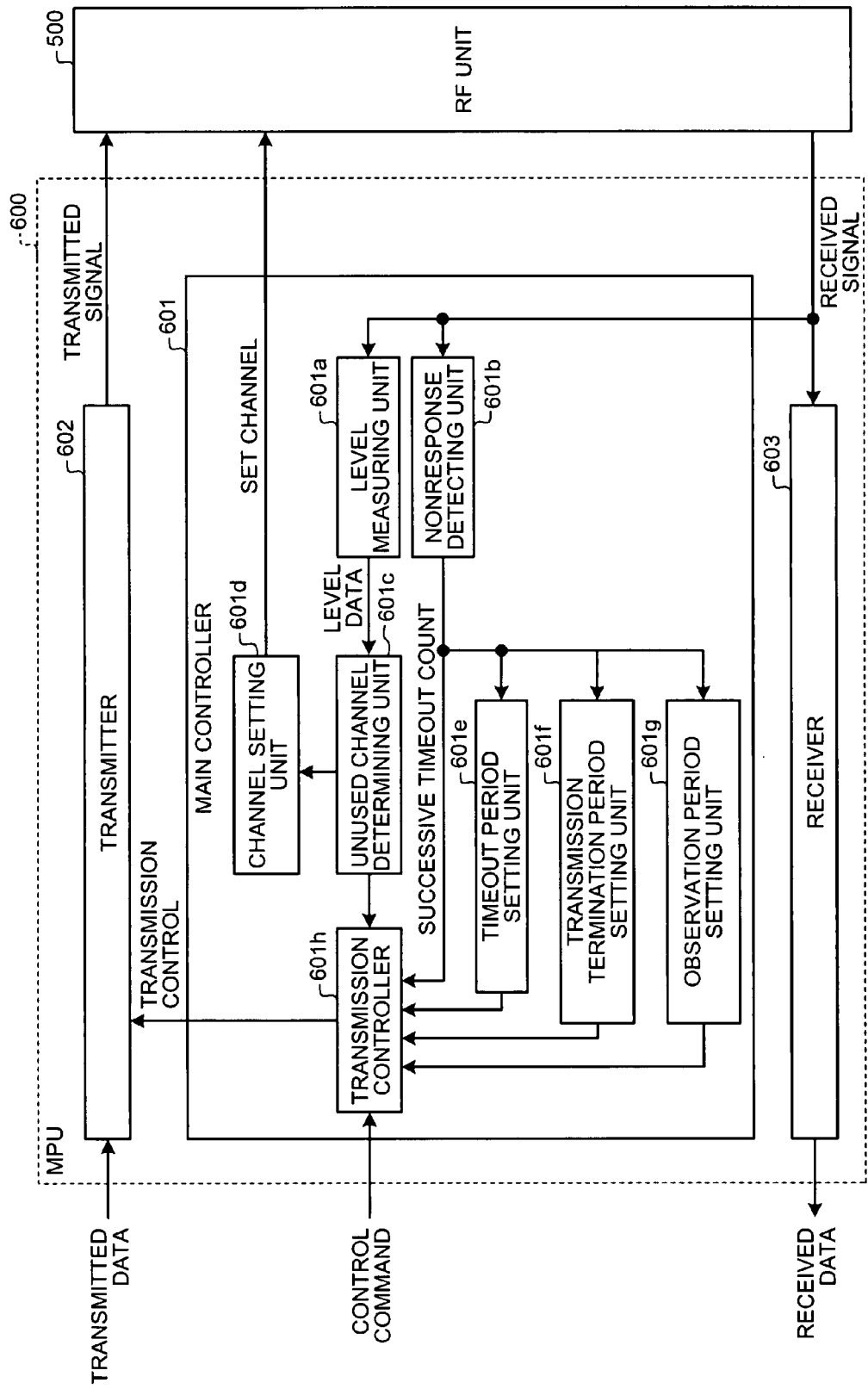
FIG. 6 is a functional block diagram of a structure of an MPU of the reader/writer according to an embodiment of the present invention.

FIG. 6 is a functional block diagram of the structure of the MPU of the reader/writer according to an embodiment of the present invention. A structure of the reader/writer according to the embodiment other than the MPU is shown in FIG. 2.

The MPU 600 includes a main controller 601, a transmitter 602, and a receiver 603. The main controller 601 controls the MPU 600. The main controller 601 includes a level measuring unit 601a, a nonresponse detecting unit 601b, an unused channel determining unit 601c, a channel setting unit 601d, a timeout period setting unit 601e, a transmission termination period setting unit 601f, a observation period setting unit 601g, and a transmission controller 601h.

The level measuring unit 601a measures a level (output strength) of received signals (response signals) that are received from the IC tag, and outputs an individual measurement result to the unused channel determining unit 601c. The nonresponse detecting unit 601b detects a nonresponse from the IC tag during a timeout period. The nonresponse detecting unit 601b determines whether a ratio of a number of nonresponses of the IC tag during a timeout period exceeds a first predetermined value. The nonresponse detecting unit 601b also determines whether a ratio of a number of nonresponses of the IC tag during a second timeout period that is a fixed period at the end of the first timeout period exceeds a second predetermined value. Based on a determination result, upon determining that a timeout has occurred, the nonresponse detecting unit 601b adds 1 to a successive timeout count and outputs it to the timeout period setting unit 601e, the transmission termination period setting unit 601f, and the observation period setting unit 601g.

The unused channel determining unit 601c searches for a channel of an unused frequency band and selects the channel. The channel setting unit 601d carries out a setting to allocate the channel selected by the unused channel determining unit 601c for the command transmission to the IC tag. Data of a set channel that is set by the channel setting unit 601d is output to the RF unit 500 for frequency setting.

Based on the successive timeout count that is output by the nonresponse detecting unit 601b, the timeout period setting unit 601e sets the timeout period. If $N_{to}$ (number) is the successive timeout count, a timeout period $T_{to}$ (milliseconds) is calculated using the following expression. The timeout period setting unit 601e outputs the timeout period that is calculated by Equation (1) to the transmission controller 601h. [R] is a Gauss symbol and indicates a maximum integer that does not exceed a real number R.

$$T_{to}=M_{to}\Delta T+T_{init}+T_{rnd} \qquad (1)$$

where $M_{to}=[N_{to}/T_{step}]$, $N_{to}$ is a successive timeout count, $T_{step}$ is a constant, $\Delta T$ is a constant that indicates an increment step value, $T_{init}$ is a constant, and $T_{rnd}$ is a uniform random number such that $0 \leq T_{rnd} \leq T_{rnd\_max}$ (where $T_{rnd\_max}$ is a constant).

If different reader/writers start an initial command transmission at the same timing, the successive timeout count $N_{to}$ becomes the same. Subsequently, $T_{to}$, $T_{sleep}$, and $T_{ct}$ become the same, and the reader/writers semi-permanently interfere with each other. However, if a uniform random number $T_{rnd}$ (milliseconds) is added to $T_{to}$, occurrence of the aforementioned drawback can be reduced as much as possible.

Taking $T_{step}$ as "2", $\Delta T$ as "10 to 20 milliseconds", $T_{init}$ as "5 milliseconds", and $T_{rnd\_max}$ as "5 milliseconds" is desirable as an execution mode of Equation (1).

Based on the successive timeout count that is output by the nonresponse detecting unit 601b, the transmission termination period setting unit 601f sets a transmission termination period. If $N_{to}$ is the successive timeout count, a transmission termination period $T_{sleep}$ is calculated by the following expression. The timeout period setting unit 601e outputs the transmission termination period calculated by Equation (2) to the transmission controller 601h.

$$T_{sleep}=T_{sleep\_init}/(M_{to}+1) \qquad (2)$$

where $M_{to}$ is similar as Equation (1), and $T_{sleep\_init}$ is a constant.

Taking $T_{sleep\_init}$ as "4 seconds" is desirable as an execution mode of Equation (2).

Based on the successive timeout count that is output by the nonresponse detecting unit 601b, the observation period setting unit 601g sets the observation period. The observation period $T_{ct}$ is calculated by Equation (3). The timeout period setting unit 601e outputs the observation period calculated by the following expression to the transmission controller 601h.

$$T_{ct} = T_{sleep} \quad (3)$$

where $T_{sleep}$ is similar as in Equation (2).

$T_{rnd}$ can be chosen according to a priority of the reader/writer, in other words, from a different range according to the successive timeout count $N_{to}$. In other words, $T_{rnd\_max}$ can differ according to the successive timeout count $N_{to}$. If the different reader/writers having the same successive timeout count $N_{to}$ start the initial command transmission at the same timing, $T_{to}$, $T_{sleep}$, and $T_{ct}$ become the same, and the reader/writers semi permanently interfere with each other. However, due to different $T_{rnd\_max}$, occurrence of the aforementioned drawback can be reduced as much as possible.

Based on the timeout period $T_{to}$ set by the timeout period setting unit 601e, the transmission controller 601h detects a timeout according to a control command from an external device. The transmission controller 601h terminates the command transmission only during the transmission termination period $T_{sleep}$ that is set by the transmission termination period setting unit 601f. The transmission controller 601h outputs transmission control data of the command to the transmitter 602 to ensure that the timeout is repeatedly detected only during the observation period $T_{ct}$ that is set by the observation period setting unit 601g.

After starting the command transmission by detecting the unused channel using the carrier sensing, upon detecting that communication with the IC tag cannot be carried out, the reader/writer assumes that interference has occurred with the IC tag and terminates the command transmission. Detection of the interference is explained below.

The nonresponse detecting unit 601b evaluates whether the ratio of the number of nonresponses of the IC tag in response to the command from the reader/writer during the timeout period exceeds the first predetermined value. Based on the evaluation, if the ratio of the number of nonresponses of the IC tag is exceeding the first predetermined value, the nonresponse detecting unit 601b further calculates the ratio of the number of nonresponses of the IC tag during a second timeout period $T_{check}$ at the end of the timeout period $T_{to}$ for reconfirmation, and determines that the interference has been detected only if the ratio of the number of nonresponses of the IC tag exceeds the second predetermined value (the aforementioned process is called an interference detecting process).

Upon detection of the interference, the reader/writer terminates the command transmission to the IC tag during the transmission termination period $T_{sleep}$ as a timeout process, and after lapse of the transmission termination period $T_{sleep}$ carries out the carrier sensing once again. If the interference is not detected, the interference detecting process is repeated from a start time of the command transmission during the observation period $T_{ct}$. Because the interference detecting process is not carried out after the observation period $T_{ct}$, the reader/writer that did not experienced the timeout during the observation period $T_{ct}$ can continue communication with the maximum continuous transmission period $T_1$ as the upper limit. However, if further communication is not necessary, the communication can also be ended before reaching the maximum continuous transmission period $T_1$.

Due to control based on Equation (1), because the timeout period $T_{to}$ of the reader/writer having a greater successive timeout count $N_{to}$ increases, the reader/writer is not easily timed out compared to other reader/writers having a lower value of the successive timeout count $N_{to}$. Moreover, because the other reader/writers terminate the command transmission due to timeout, the reader/writer can increase a probability of getting a chance of the command transmission. Further, due to control based on Equations (2) and (3), the reader/writer having a greater successive timeout count $N_{to}$ increases a frequency of the carrier sensing and by limiting the observation period $T_{ct}$ reduces a possibility of getting timed out. Thus, the interference between the reader/writer and the IC tag can be autonomously avoided without the need to carry out complex settings each time a set up environment changes.

Based on the transmission control data from the transmission controller 601h, the transmitter 602 exercises transmission control of a command that is transmitted from the host computer to the IC tag as the transmission data, and transmits the command to the RF unit 500. The receiver 603 distributes to the host computer as the received data, the received signals that are received from the IC tag via the RF unit 500.

Figure 7:
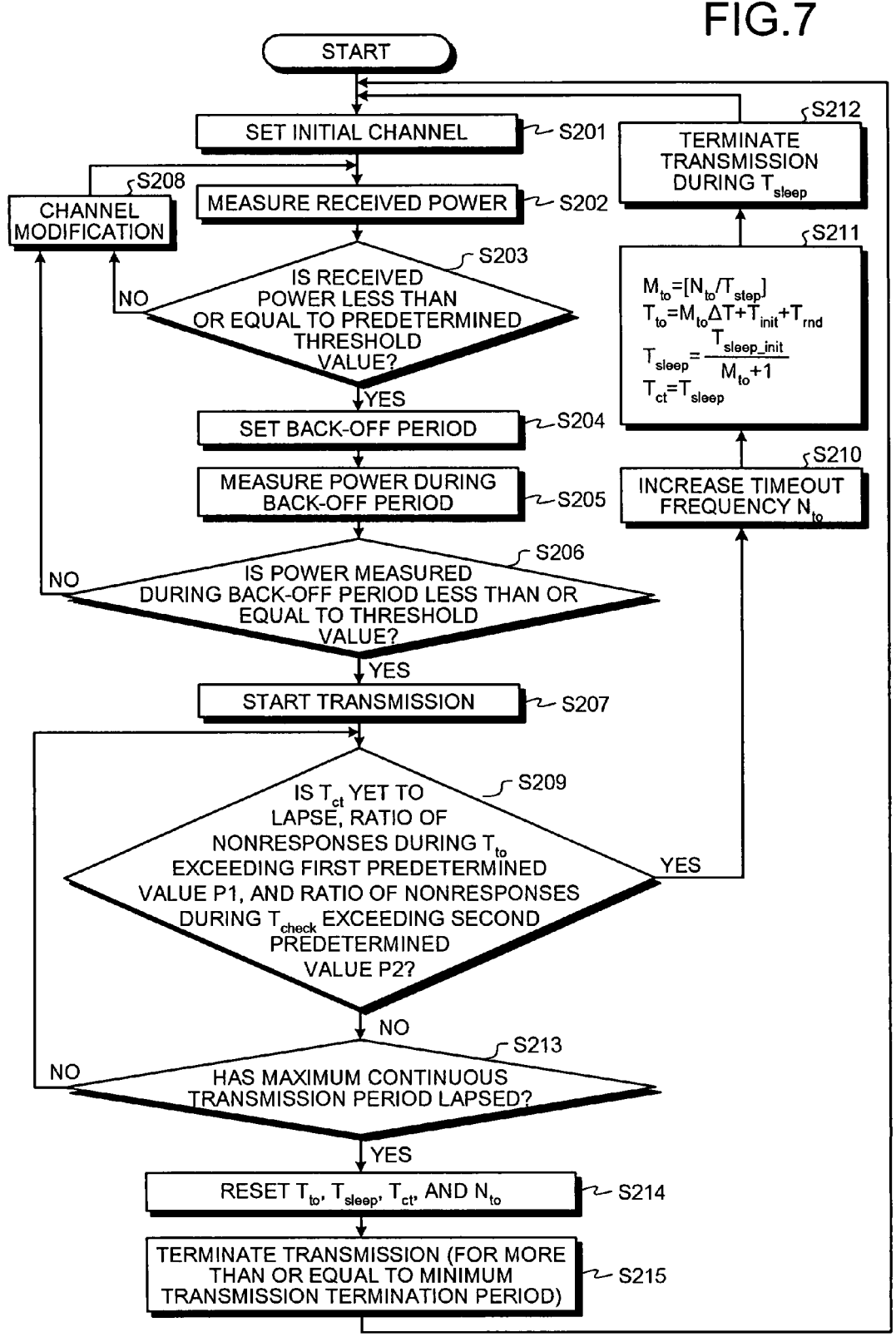
FIG. 7 is a flowchart of a sequence of a carrier sensing process according to the embodiment.

FIG. 7 is a flowchart of the carrier sensing process according to the embodiment. As shown in FIG. 7, first the channel setting unit 601d of the MPU 600 of the reader/writer 700 sets the initial channel (frequency) (step S201). Next, the level measuring unit 601a of the MPU 600 measures the received power of the received waves of the set channel (step S202) and determines whether the received power of the received waves is less than or equal to the threshold value (for example, −74 dBm) (step S203).

Upon determining that the received power is less than or equal to the threshold value (Yes at step S203), the carrier sensing process moves to step S204. Upon determining that the received power is not less than or equal to the threshold value (No at step S203), the carrier sensing process moves to step S208. Next, the MPU 600 randomly sets the back-off period that is the waiting period (step S204). Next, the level measuring unit 601a of the MPU 600 measures the received power during the back-off period that is set at step S204 (step S205).

The level measuring unit 601a of the MPU 600 determines whether the measured power during the back-off period is less than or equal to the threshold value (for example, −74 dBm) (step S206). Upon determining that the received power is less than the threshold value (Yes at step S206), the carrier sensing process moves to step S207. Upon determining that the received power is not less than or equal to the threshold value (No at step S206), the carrier sensing process moves to step S208.

At step S207, the transmission controller 601h of the MPU 600 starts the command transmission. The nonresponse detecting unit 601b of the MPU 600 determines whether the observation period $T_{ct}$ is yet to lapse, whether the ratio of the number of nonresponses of the IC tag during the timeout period $T_{to}$ is exceeding the first predetermined value, and whether the ratio of the number of nonresponses of the IC tag during the second timeout period $T_{check}$ is exceeding the second predetermined value (step S209).

Upon the nonresponse detecting unit 601b determining that the observation period $T_{ct}$ is yet to lapse, the ratio of the number of nonresponses of the IC tag during the timeout period $T_{to}$ is exceeding the first predetermined value, and the ratio of the number of nonresponses of the IC tag during the second timeout period $T_{check}$ is exceeding the second predetermined value (Yes at step S209), the carrier sensing process moves to step S210. Upon the nonresponse detecting unit 601b determining that the observation period $T_{ct}$ has lapsed, the ratio of the number of nonresponses of the IC tag during the timeout period $T_{to}$ is less than or equal to the first predetermined value, or the ratio of the number of nonresponses of the IC tag during the second timeout period $T_{check}$ is less than or equal to the second predetermined value (No at step S209), the carrier sensing process moves to step S213.

At step S210, the nonresponse detecting unit 601b adds 1 to the timeout frequency $N_{to}$. Based on Equations (1) to (3), the MPU 600 sets the timeout period $T_{to}$, the transmission termination period $T_{sleep}$, and the observation period $T_{ct}$ (step S211). Next, the MPU 600 terminates the command transmission during the transmission termination period $T_{sleep}$ (step S212). Upon completion of a process to terminate the command transmission, the carrier sensing process moves to step S201.

At step S213, the transmission controller 601h of the MPU 600 determines whether the maximum continuous transmission period $T_1$ has lapsed after starting the command transmission at step S207 (step S213). Upon the transmission controller 601h determining that the maximum continuous transmission period $T_1$ has lapsed (Yes at step S213), the carrier sensing process moves to step S214. Upon the transmission controller 601h determining that the maximum continuous transmission period $T_1$ has not lapsed (No at step S213), the carrier sensing process moves to step S209.

At step S214, the MPU 600 initializes the timeout period $T_{to}$, the transmission termination period $T_{sleep}$, the observation period $T_{ct}$, and the successive timeout count $N_{to}$. Next, the MPU 600 terminates the command transmission during a time period that is more than or equal to the minimum transmission termination period $T_2$ (step S215). Upon completion of a process to terminate the command transmission, the carrier sensing process moves to step S201.

Figure 8:
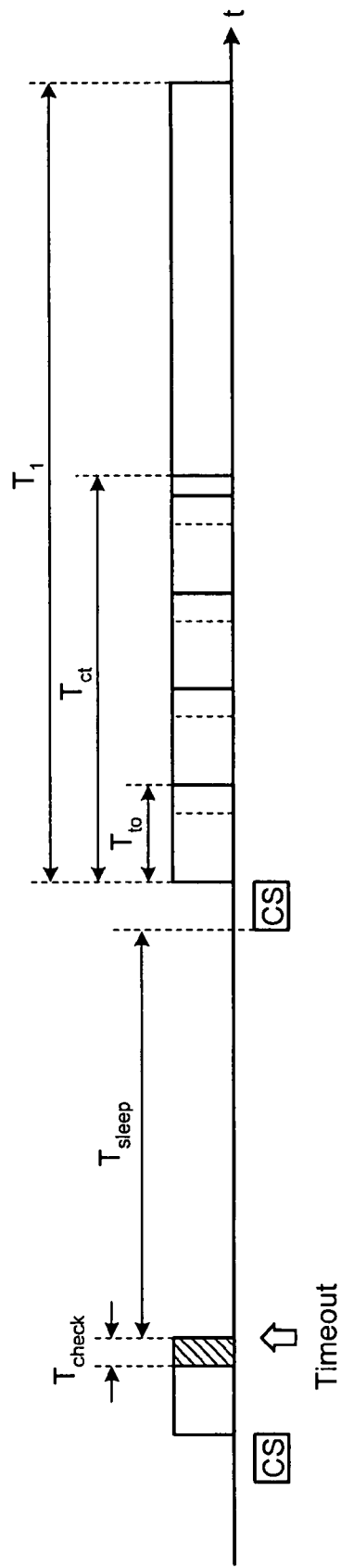
FIG. 8 is a schematic for explaining an operation during a timeout according to the embodiment.

An operation during the timeout according to the embodiment is explained next. FIG. 8 is a schematic for explaining the operation during the timeout according to the embodiment. As shown in FIG. 8, the reader/writer is timed out due to detection of interference in the first timeout period $T_{to}$ after carrying out the carrier sensing and starting the command transmission to the IC tag, and terminates the command transmission during the transmission termination period $T_{sleep}$. The reader/writer starts the second command transmission by carrying out the carrier sensing immediately after lapse of the transmission termination period $T_{sleep}$. Because the interference is not detected during the observation period $T_{ct}$, the reader/writer communicates with the IC tag until the maximum continuous transmission period $T_1$.

FIG. 9 is a schematic for explaining the example of the operation (when three reader/writers are included) according to the embodiment. As shown in FIG. 9, a first reader/writer includes an $M_{to}$ of "1", a second reader/writer includes an $M_{to}$ of "0", and a third reader/writer includes an $M_{to}$ of "0". $M_{to}$ indicates a numerical value that increases according to the timeout frequency $N_{to}$ and is defined by Equation (1).

The first reader/writer and the second reader/writer start the command transmission simultaneously, and are timed out together due to mutual interference. Because the third reader/writer starts the command transmission marginally later than the first reader/writer and the second reader/writer, the interference is not detected in the initial six interference detecting processes. Because the first reader/writer restarts the command transmission after the transmission termination period $T_{sleep}$, the third reader/writer receives the interference and is timed out by the seventh interference detecting process.

Although the second reader/writer restarts the command transmission after the transmission termination period $T_{sleep}$, because the transmission termination period $T_{sleep}$ of the second reader/writer is greater than the transmission termination period $T_{sleep}$ of the first reader/writer, a time period that exceeds the observation period $T_{ct}$ lapses after the first reader/writer has already started the second command transmission, the second reader/writer detects the interference from the first reader/writer and is timed out again. Thus, the reader/writer having the greater successive timeout count $N_{to}$ can preferentially carry out the command transmission compared to the reader/writer having the smaller successive timeout count $N_{to}$.

According to the embodiment, without linking to the other reader/writers using a wired network, each reader/writer uses a time-sharing operation that is based on autonomous control of each reader/writer to reduce the interference with the IC tag. Further, adaptive control of the reader/writers is also enabled such that the reader/writers automatically and autonomously adapt to the environment even if the set up environment changes.

All the processes explained in the embodiment can be realized by executing a prior formulated program by a computer system such as a personal computer, a server, or a workstation.

The invention in its broader aspects is not limited to the specific details and representative embodiments shown and described herein. Accordingly, various modifications may be made without departing from the spirit or scope of the general inventive concept as defined by the appended claims and their equivalents. Further, effects described in the embodiments are not to be thus limited.

All the automatic processes explained in the present embodiment can be, entirely or in part, carried out manually. Similarly, all the manual processes explained in the present embodiment can be entirely or in part carried out automatically by a known method.

The sequence of processes, the sequence of controls, specific names, and data including every type of data or various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the apparatus are entirely or partially realized by a program that is executed by a central processing unit (CPU) (or an MPU), a micro control unit (MCU) or by a hardware using wired logic.

As describe above, according to an embodiment of the present invention, if a ratio of nonresponses from an electronic tag during a first predetermined period has exceeded a predetermined value, signal transmission is terminated during a fixed period. Thus, interference between a plurality of RFID interrogators and the electronic tag can be curbed.

Furthermore, according to an embodiment of the present invention, whether to terminate the signal transmission to the electronic tag during the fixed period is further determined during a fixed period at the end of a first predetermined period. Thus, the signal transmission of the RFID interrogator having a long first predetermined period can be carried out preferentially.

Moreover, according to an embodiment of the present invention, whether the ratio of the number of nonresponses from the electronic tag during the first predetermined period has exceeded the predetermined value is repeatedly determined during a predetermined determination period. Thus, the signal transmission of the RFID interrogator having a short predetermined determination period can be carried out preferentially.

Furthermore, according to an embodiment of the present invention, the first predetermined period is decided according to a transmission termination frequency that causes the transmission to be terminated continuously during a second predetermined period. Thus, a possibility of the ratio of nonresponses from the electronic tag during the first predetermined period exceeding the predetermined value can be reduced in direct proportion to a continuous transmission termination frequency, and a preferential control of transmission termination according to the continuous transmission termination frequency is enabled.

Moreover, according to an embodiment of the present invention, the second predetermined period is decided according to the continuous transmission termination frequency. Thus, a possibility of restarting the signal transmission to the electronic tag by quickly returning from the second predetermined period increases in direct proportion to the continuous transmission termination frequency, and a preferential control of transmission restart according to the continuous transmission termination frequency is enabled.

Furthermore, according to an embodiment of the present invention, the predetermined determination period is decided according to the continuous transmission termination frequency. Due to this, the predetermined determination period can be reduced in inverse proportion to the continuous transmission termination frequency. Thus, during the predetermined determination period, a number of determination results can be reduced in which the ratio of the number of nonresponses from the electronic tag during the first predetermined period has exceeded the predetermined value, and a preferential control of the transmission termination according to the continuous transmission termination frequency is enabled.

Moreover, according to an embodiment of the present invention, the possibility of the ratio of nonresponses from the electronic tag during the first predetermined period exceeding the predetermined value can be reduced in direct proportion to the continuous transmission termination frequency. Thus, the preferential control of the transmission termination according to the continuous transmission termination frequency is enabled.

Furthermore, according to an embodiment of the present invention, the possibility of restarting the signal transmission to the electronic tag by quickly returning from the second predetermined period increases in direct proportion to the continuous transmission termination frequency. Thus, the preferential control of the transmission restart according to the continuous transmission termination frequency is enabled.

Moreover, according to an embodiment of the present invention, the predetermined determination period can be reduced in direct proportion to the continuous transmission termination frequency. Due to this, during the predetermined determination period, the number of determination results can be reduced in which the ratio of the number of nonresponses from the electronic tag during the first predetermined period has exceeded the predetermined value. Thus, the preferential control of the transmission termination according to the continuous transmission termination frequency is enabled.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A radio-frequency-identification interrogator that performs a communication-channel selecting process in a minimum transmission termination period for selecting, upon stipulation of a maximum continuous transmission period to continuously transmit a signal to an electronic tag and the minimum transmission termination period to terminate a signal transmission after a lapse of the maximum continuous transmission period, an appropriate communication channel to be used in the signal transmission before the signal transmission to the electronic tag, the radio-frequency-identification interrogator comprising:
   a nonresponse-ratio determining unit that determines, after a plurality of signals are transmitted in the signal transmission, whether a ratio of a number of nonresponses during a first predetermined period from the electronic tag to a number of the plurality of signals exceeded a predetermined value; and
   a signal-transmission terminating unit that terminates, when it is determined that the ratio of the number of nonresponses during the first predetermined period from the electronic tag to the number of the plurality of signals exceeded the predetermined value, the signal transmission to the electronic tag for a second predetermined period, wherein
   the radio-frequency-identification interrogator performs, after a lapse of the second predetermined period, the communication-channel selecting process for restarting the signal transmission to the electronic tag.

2. The radio-frequency-identification interrogator according to claim 1, wherein
   the nonresponse-ratio determining unit further determines, when it is determined that the ratio of the number of nonresponses during the first predetermined period from the electronic tag to the number of the plurality of signals exceeded the predetermined value, whether the ratio of the number of nonresponses during a fixed period at the end of the first predetermined period from the electronic tag to the number of the Plurality of signals exceeded the predetermined value, and
   the signal-transmission terminating unit terminates, when it is determined that the ratio of the number of nonresponses during the fixed period from the electronic tag to the number of the plurality of signals exceeded the predetermined value, the signal transmission to the electronic tag for the second predetermined period.

3. The radio-frequency-identification interrogator according to claim 1, wherein
   the nonresponse-ratio determining unit repeats determination whether the ratio of the number of nonresponses during the first predetermined period from the electronic tag to the number of the plurality of signals exceeded the predetermined value, during a predetermined determination period.

4. The radio-frequency-identification interrogator according to claim 3, further comprising:
   a transmission-termination counting unit that counts a successive timeout count that is a number of times the signal-transmission terminating unit terminates the signal transmission to the electronic tag for the second predetermined period; and
   a first predetermined-period deciding unit that decides the first predetermined period based on the successive timeout count.

5. The radio-frequency-identification interrogator according to claim 4, further comprising:
a second predetermined-period deciding unit that decides the second predetermined period based on the successive timeout count.

6. The radio-frequency-identification interrogator according to claim 4, further comprising:
a predetermined-determination-period deciding unit that decides the predetermined determination period based on the successive timeout count.

7. The radio-frequency-identification interrogator according to claim 4, wherein
the first predetermined-period deciding unit decides the first predetermined period in direct proportion to the successive timeout count.

8. The radio-frequency-identification interrogator according to claim 5, wherein
the second predetermined-period deciding unit decides the second predetermined period in inverse proportion to the successive timeout count.

9. The radio-frequency-identification interrogator according to claim 6, wherein
the predetermined-determination-period deciding unit decides the predetermined determination period in inverse proportion to the successive timeout count.

10. The radio-frequency-identification interrogator according to claim 7, wherein
the first predetermined-period deciding unit decides the first predetermined period by $$Tto = Mto \Delta T + Tinit + Trnd$$

where Tto is the first predetermined period, Mto=[Nto/Tstep], Nto is the successive timeout count, Tstep is a constant, $\Delta T$ is a constant indicating an increment step value, Tinit is a constant, and Trnd is a uniform random number such that $0 \leq Trnd \leq Trnd\_max$ (where Trnd_max is a constant).

11. The radio-frequency-identification interrogator according to claim 10, wherein
the uniform random number is selected from a different range according to a priority of the signal transmission based on the successive timeout count.

12. The radio-frequency-identification interrogator according to claim 8, wherein
the second predetermined-period deciding unit decides the second predetermined period by $$Tsleep = Tsleep\_init/(Mto+1)$$

where Tsleep is the second predetermined period, Mto=[Nto/Tstep], Nto is the successive timeout count, Tstep is a constant, and Tsleep_init is a constant.

13. The radio-frequency-identification interrogator according to claim 9, wherein
the predetermined-determination-period deciding unit decides the predetermined determination period by $$Tct = Tsleep$$

where Tct is the predetermined determination period, Tsleep=Tsleep_init/(Mto+1), Tsleep is the second predetermined period, Mto=[Nto/Tstep], Nto is the successive timeout count, Tstep is a constant, and Tsleep_init is a constant.

14. The radio-frequency-identification interrogator according to claim 6, further comprising:
an initializing unit that initializes, when the nonresponse-ratio determining unit repeatedly determines whether the ratio of the number of nonresponses during the first predetermined period from the electronic tag to the number of the plurality of signals exceeded the predetermined value period during the predetermined determination period, and when it is determined that the ratio of the number of nonresponses during the first predetermined period from the electronic tag to the number of the plurality of signals did not exceed the predetermined value in all determinations, the first predetermined period, the second predetermined period, and the predetermined determination period.

15. A method of controlling a radio-frequency-identification interrogator that performs a communication-channel selecting process in a minimum transmission termination period for selecting, upon stipulation of a maximum continuous transmission period to continuously transmit a signal to an electronic tag and the minimum transmission termination period to terminate a signal transmission after a lapse of the maximum continuous transmission period, an appropriate communication channel to be used in the signal transmission before the signal transmission to the electronic tag, the method comprising:
determining, after a plurality of signals are transmitted in the signal transmission, whether a ratio of number of nonresponses during a first predetermined period from the electronic tag to the number of the plurality of signals exceeded a predetermined value;
terminating, when it is determined that the ratio of the number of nonresponses during the first predetermined period from the electronic tag to the number of the plurality of signals exceeded the predetermined value, the signal transmission to the electronic tag for a second predetermined period; and
performing, after a lapse of the second predetermined period, the communication-channel selecting process for restarting the signal transmission to the electronic tag.

16. The method according to claim 15, wherein
the determining includes determining, when it is determined that the ratio of the number of nonresponses during the first predetermined period from the electronic tag to the number of the plurality of signals exceeded the predetermined value, whether the ratio of the number of nonresponses during a fixed period at the end of the first predetermined period from the electronic tag to the number of the plurality of signals exceeded the predetermined value, and
the terminating includes terminating, when it is determined that the ratio of the number of nonresponses during the fixed period from the electronic tag to the number of the plurality of signals exceeded the predetermined value, the signal transmission to the electronic tag for the second predetermined period.

17. The method according to claim 15, wherein
the determining includes repeating determination whether the ratio of the number of nonresponses during the first predetermined period from the electronic tag to the number of the plurality of signals exceeded the predetermined value, during a predetermined determination period.

18. The method according to claim 17, further comprising:
counting a successive timeout count that is a number of times the signal transmission to the electronic tag is terminated for the second predetermined period; and
deciding the first predetermined period based on the successive timeout count.

19. The method according to claim 18, further comprising:
deciding the second predetermined period based on the successive timeout count.

20. The method according to claim 18, further comprising:
deciding the predetermined determination period based on the successive timeout count.

* * * * *